United States Patent
Sheridan et al.

(10) Patent No.: US 9,777,595 B2
(45) Date of Patent: Oct. 3, 2017

(54) LUBRICATION SYSTEM FOR GEARED GAS TURBINE ENGINE

(71) Applicant: United Technologies Corporation, Hartford, CT (US)

(72) Inventors: William G. Sheridan, Southington, CT (US); Gabriel L. Suciu, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 273 days.

(21) Appl. No.: 14/704,631

(22) Filed: May 5, 2015

(65) Prior Publication Data
US 2016/0326906 A1    Nov. 10, 2016

(51) Int. Cl.
*F01D 25/12* (2006.01)
*F01D 25/18* (2006.01)
(Continued)

(52) U.S. Cl.
CPC .............. *F01D 25/12* (2013.01); *B64C 11/14* (2013.01); *F01D 25/18* (2013.01); *F02C 7/04* (2013.01); *F02C 7/06* (2013.01); *F02C 7/14* (2013.01); *F02C 7/36* (2013.01); *F02K 3/06* (2013.01); *F05D 2220/32* (2013.01);
(Continued)

(58) Field of Classification Search
CPC .. F01D 25/12; F01D 25/18; F02C 7/04; F02C 7/06; F02C 7/14; F02C 7/36; F02K 3/06; F05D 2220/32; F05D 2260/213; F05D 2260/40311; F05D 2260/98
See application file for complete search history.

(56) References Cited

U.S. PATENT DOCUMENTS 2,474,143 A * 6/1949 Forsyth ................. F02C 6/20
  416/94
2,779,423 A * 1/1957 Cushman ............. B64D 33/10
  416/94
(Continued)

FOREIGN PATENT DOCUMENTS

EP    2554874    2/2013
GB    2204642    11/1988

OTHER PUBLICATIONS

Extended European Search Report dated Oct. 17, 2016 in European Application No. 16168488.1.

*Primary Examiner* — Igor Kershteyn
(74) *Attorney, Agent, or Firm* — Snell & Wilmer, L.L.P.

(57) ABSTRACT

An oil cooling system is provided. The system may comprise an oil inlet, a manifold fluidly coupled to the oil inlet, and a support strut comprising internal tubing fluidly coupled to the manifold. A heat exchanger may be fluidly coupled to the internal tubing of the support strut. A nose cone may be disposed forward of the heat exchanger and configured to rotate about an axis. The heat exchanger may be radially inward from a portion of the nose cone. A gas turbine engine is also provided. The gas turbine engine may comprise an epicyclic gear system and fan mechanically coupled to the epicyclic gear system. The fan may be configured to rotate about an axis. A nose cone may be coupled to the fan and configured to rotate about the axis. A heat exchanger may be aft of the fan and in fluid communication with the epicyclic gear system.

20 Claims, 4 Drawing Sheets

(51) Int. Cl.
*B64C 11/14* (2006.01)
*F02K 3/06* (2006.01)
*F02C 7/04* (2006.01)
*F02C 7/06* (2006.01)
*F02C 7/14* (2006.01)
*F02C 7/36* (2006.01)

(52) U.S. Cl.
CPC .......... *F05D 2260/213* (2013.01); *F05D 2260/40311* (2013.01); *F05D 2260/98* (2013.01); *Y02T 50/676* (2013.01)

(56) References Cited

U.S. PATENT DOCUMENTS

| | | | | |
|---|---|---|---|---|
| 2,848,054 | A | * | 8/1958 | Pearl ............... B64C 11/14 416/94 |
| 3,942,911 | A | * | 3/1976 | Keenan ............. F01D 7/00 416/157 A |
| 4,041,697 | A | * | 8/1977 | Coffinberry ........ F02C 7/14 123/41.33 |
| 4,722,666 | A | | 2/1988 | Dennison et al. |
| 4,934,140 | A | * | 6/1990 | Dennison ........... F02C 7/20 244/54 |
| 4,999,994 | A | * | 3/1991 | Rud ................. F02C 7/047 416/170 R |
| 6,223,616 | B1 | | 5/2001 | Sheridan |
| 8,585,538 | B2 | | 11/2013 | Sheridan et al. |
| 8,585,539 | B2 | | 11/2013 | Sheridan et al. |
| 9,062,566 | B2 | * | 6/2015 | Suciu ............... F01D 25/12 |
| 9,127,566 | B2 | * | 9/2015 | Suciu ............... F02C 7/047 |
| 2013/0259687 | A1 | | 10/2013 | Suciu et al. |

\* cited by examiner

LUBRICATION SYSTEM FOR GEARED GAS TURBINE ENGINE

FIELD OF INVENTION

The present disclosure relates to gas turbine engines, and, more specifically, lubrication system for a gas turbine engine having a geared fan.

BACKGROUND

Geared turbofan engines may use journal bearings in the gear systems. Journal bearings operate using a film of oil. As a result, geared turbofan engines use larger oil systems than direct-drive turbofan engines. The oil system for the geared engine may be twice the size of the oil system for a direct drive system. A larger oil system may result in a higher weight.

The oil used in a fan drive gear system (FDGS) is typically cooler than oil in other parts of the engine. To maintain oil at temperatures suitable to the FDGS, multiple coolers may be used. For example, one air-oil heat exchanger and one fuel-oil heat exchanger may be installed to cool oil for an FDGS. However, by adding a second oil cooler, additional volume in the engine is consumed and the weight of the engine is increased.

SUMMARY

An oil cooling system may comprise an oil inlet, a manifold fluidly coupled to the oil inlet, and a support strut comprising internal tubing fluidly coupled to the manifold. A heat exchanger may be fluidly coupled to the internal tubing of the support strut. A nose cone may be disposed forward of the heat exchanger and configured to rotate about an axis. The heat exchanger may be disposed radially inward from a portion of the nose cone.

In various embodiments, the heat exchanger may be an air-oil heat exchanger. A fan may be coupled to nose cone and configured to urge coolant over the heat exchanger. The manifold may be configured to transport oil across a fixed carrier of the epicyclic gear system. An oil outlet of the heat exchanger may be in fluid communication with a journal pin of the epicyclic gear system. The heat exchanger may be non-rotating.

A gas turbine engine may comprise an epicyclic gear system and a fan mechanically coupled to the epicyclic gear system. The fan may be configured to rotate about the axis. A nose cone may be coupled to the fan and also configured to rotate about the axis. A heat exchanger may be disposed aft of the fan and forward of the nose cone. The heat exchanger may be in fluid communication with the epicyclic gear system.

In various embodiments, the heat exchanger may be disposed radially inward from a portion of the nose cone. A secondary fan may be coupled to the nose cone and configured to urge coolant over the heat exchanger. An oil outlet of the heat exchanger may be in fluid communication with a journal pin of the epicyclic gear system. The heat exchanger may be non-rotating. The epicyclic gear system may comprise a non-rotating carrier. A support strut may mechanically couple the heat exchanger to the epicyclic gear system. The support strut may comprise internal tubing in fluid communication with the heat exchanger. A bearing system may be forward of the epicyclic gear system and aft of the heat exchanger. The heat exchanger may be configured to provide oil to the bearing system.

In various embodiments, a cooling device may comprise a nose cone configured to rotate about an axis, and a heat exchanger disposed radially inward from a portion of the nose cone. The heat exchanger may be configured to remain static about the axis.

In various embodiments, a fan may be coupled to the nose cone. The fan may be configured to urge fluid over the heat exchanger. The heat exchanger may comprise an air-oil heat exchanger.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
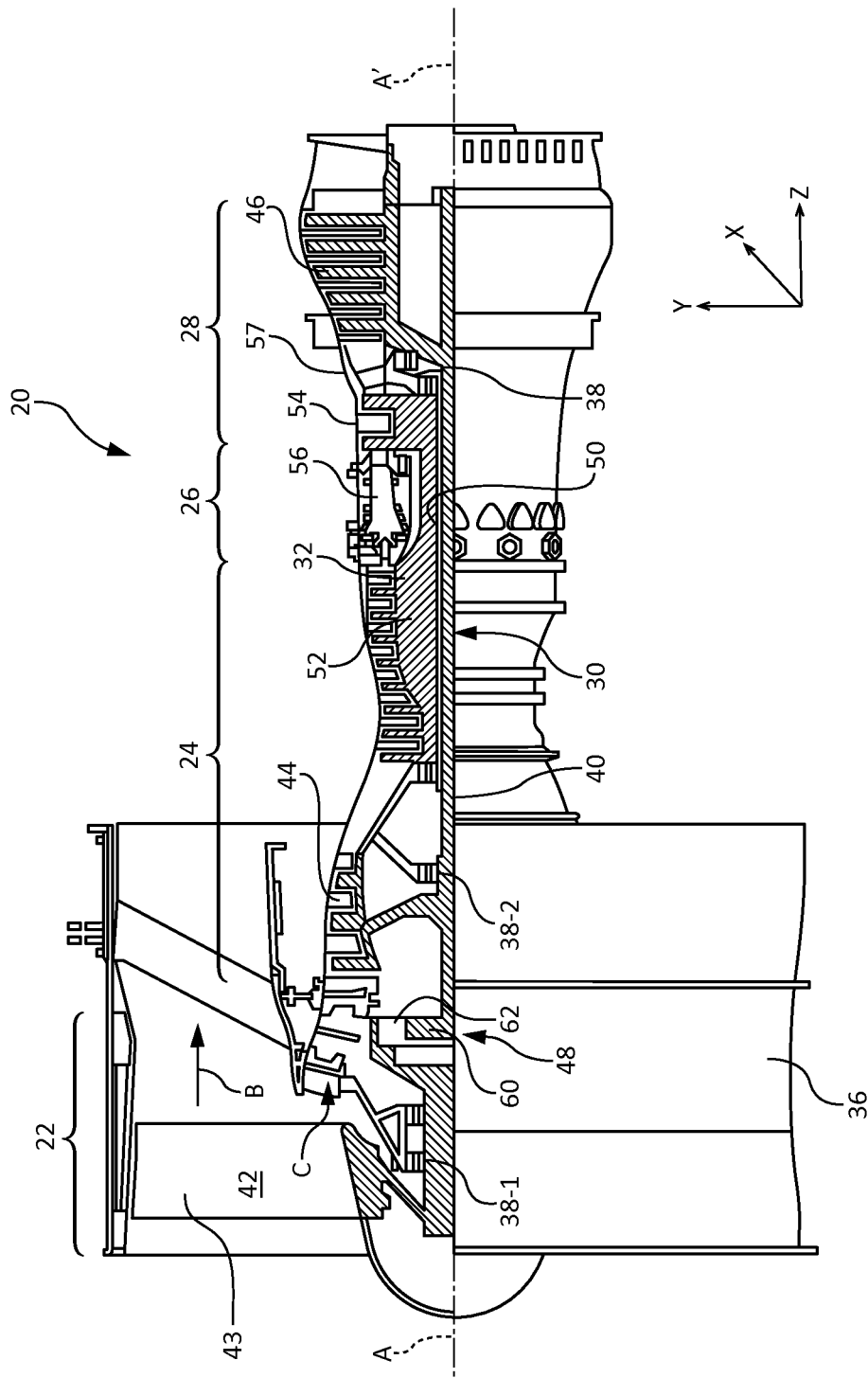
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure (or second) compressor 52 and high pressure (or second) turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor section 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other turbine engines including direct drive turbofans.

Figure 2:
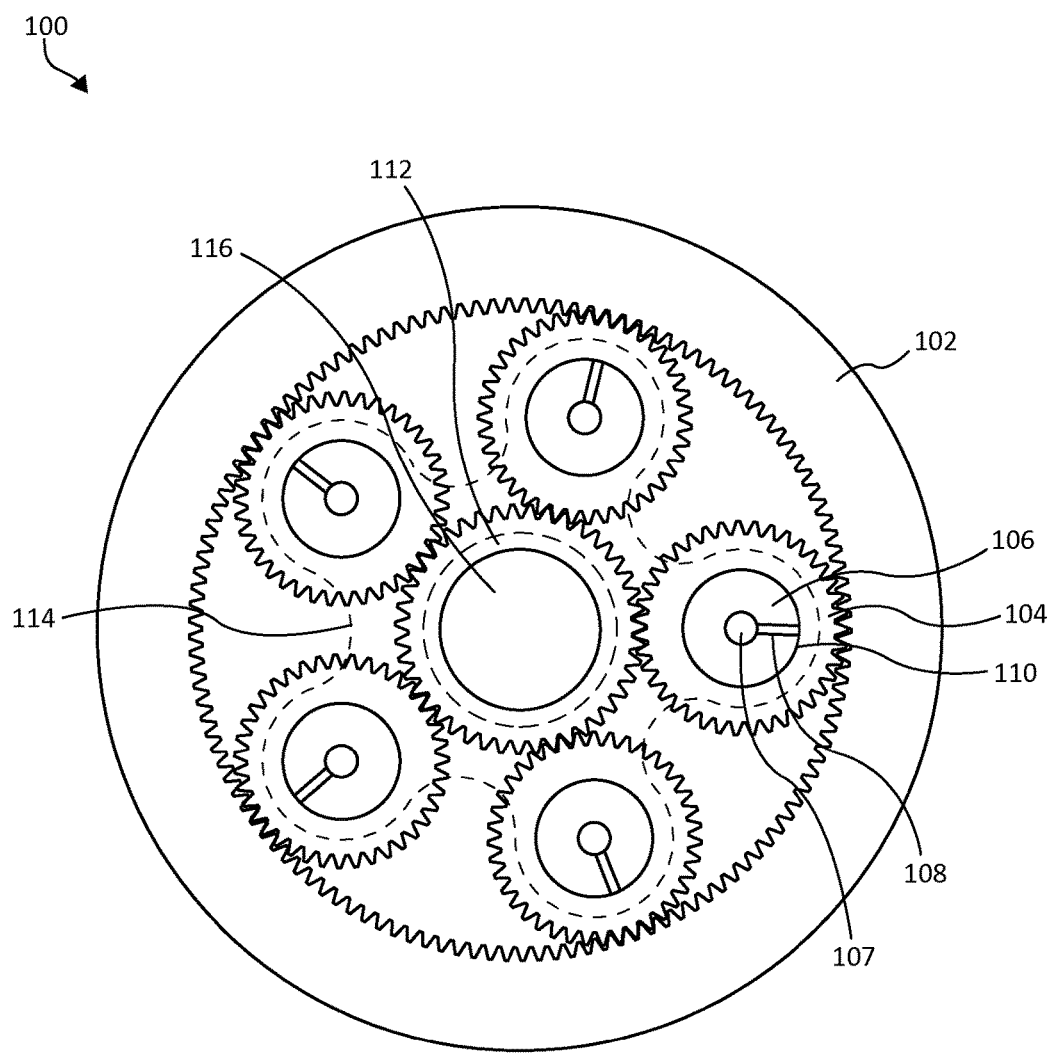
FIG. 2 illustrates an exemplary star gear system, in accordance with various embodiments.

With reference to FIG. 2, an epicyclic gear system 100, which is a view of geared architecture 48 of FIG. 1, is shown. The epicyclic gear system 100 comprises an annular gear 102. Annular gear 102 has teeth facing radially inward to interface with star gears 104. Star gears 104 may be disposed radially inward from annular gear 102 and may comprise teeth around an outer diameter of star gears 104. Star gears 104 may comprise a journal pin 106 central to star gears 104. In that regard, star gear 104 may be a journal housing that forms a journal bearing star gear 104 rotating relative to journal pin 106. Oil may be delivered through internal bore 107 of journal pin 106. The oil may pass through passage 108 to form a thin oil film 110 between journal pin 106 and star gear 104, generally following the circumference of journal pin 106. Star gear 104 may rotate about journal pin 106 with a thin oil film 110 filling a space between journal pin 106 and star gear 104 to provide lubrication.

In various embodiments, star gears 104 may be coupled to carrier 114. Carrier 114 is ghosted in FIG. 2 to provide greater detail of features behind carrier 114. A sun gear 112 may be central to epicyclic gear system 100. Sun gear 112 may be fixed to shaft 116 extending axially from the center of annular gear 102 and the center of sun gear 112.

In various embodiments, journal pin 106 may be fixed in place relative to a reference point outside the epicyclic gear system (such as an engine) by carrier 114, and both sun gear 112 and annular gear 102 may rotate. In that regard, shaft 116 and annular gear 102 may provide an input and output to epicyclic gear system 100. In various embodiments, star gears 104 may also move about sun gear 112 (star gear 104 may be referred to as a planet gear in this configuration) and either annular gear 102 or sun gear 112 may be fixed in place. In that regard, carrier 114 and the unfixed gear of sun gear 112 and annular gear 102 may provide an input and output to epicyclic gear system 100.

Figure 3:
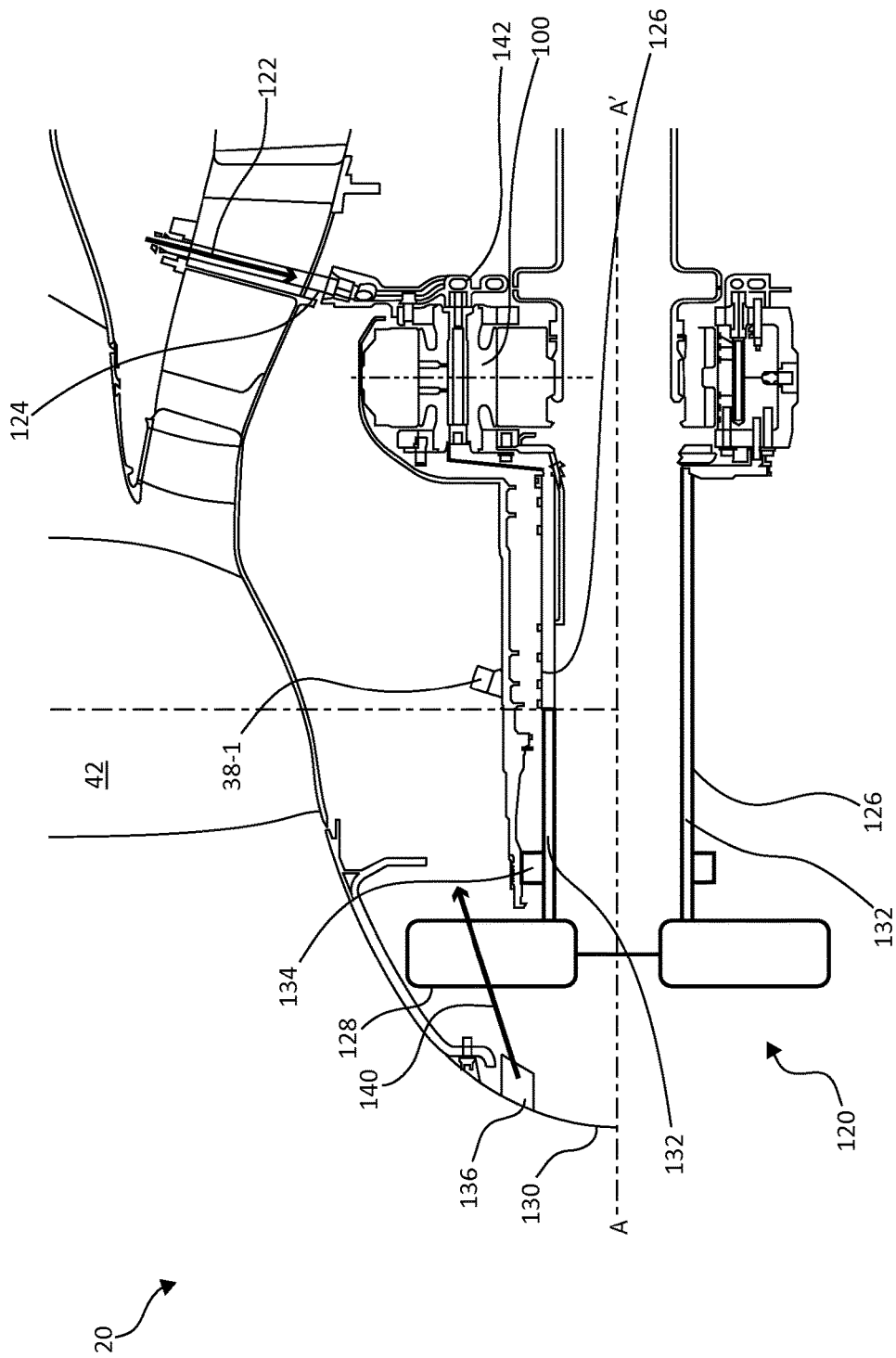
FIG. 3 illustrates a cooling system comprising a heat exchanger disposed in a nose cone of a gas turbine engine, in accordance with various embodiments.

With reference to FIG. 3, oil cooling system 120 for gas turbine engine 20 is shown with heat exchanger 128 mounted aft of nose cone 130 and forward of fan 42. Heat exchanger 128 may be circular or annular to mirror the shape of nose cone 130. Oil system 120 cools oil 122 entering the system through conduit 124. Conduit 124 may transport oil to gear system 100. Oil 122 may pass through oil manifold 142 and across carrier 114 (in FIG. 2) of gear system 100 and continue to heat exchanger 128 without being exposed to journal bearings in the gear system. Heat exchanger 128 may be an air-oil heat exchanger in which air passes over the heat exchanger and extracts heat from oil 122. After cooling, oil 122 may then be used in journal bearings and/or bearing system 38-1 for lubrication. In that regard, an oil outlet of the heat exchanger 128 may be in fluid communication with a journal pin 106 (of FIG. 2).

In various embodiments, heat exchanger 128 may be supported by support strut 126. Support strut 126 may be coupled to the non-rotating carrier (carrier 114 of FIG. 1) and thus mount heat exchanger 128 to the non-rotating carrier. Oil 122 may pass across the non-rotating carrier and into internal tubing 132 of support strut 126. Oil 122 may move forward in support strut 126, which is disposed radially inward from bearing system 38-1. Fan shaft oil seal 134 may be disposed between bearing system 38-1 and support strut 126 to retain oil 122. Support strut 126 and heat exchanger 128 may be non-rotating components of gas turbine engine 20. Fan 42 and nose cone 130 are rotating components of gas turbine engine 20. Support strut 126 may comprise internal tubing 132 to transport oil into and out of heat exchanger 128.

Figure 4:
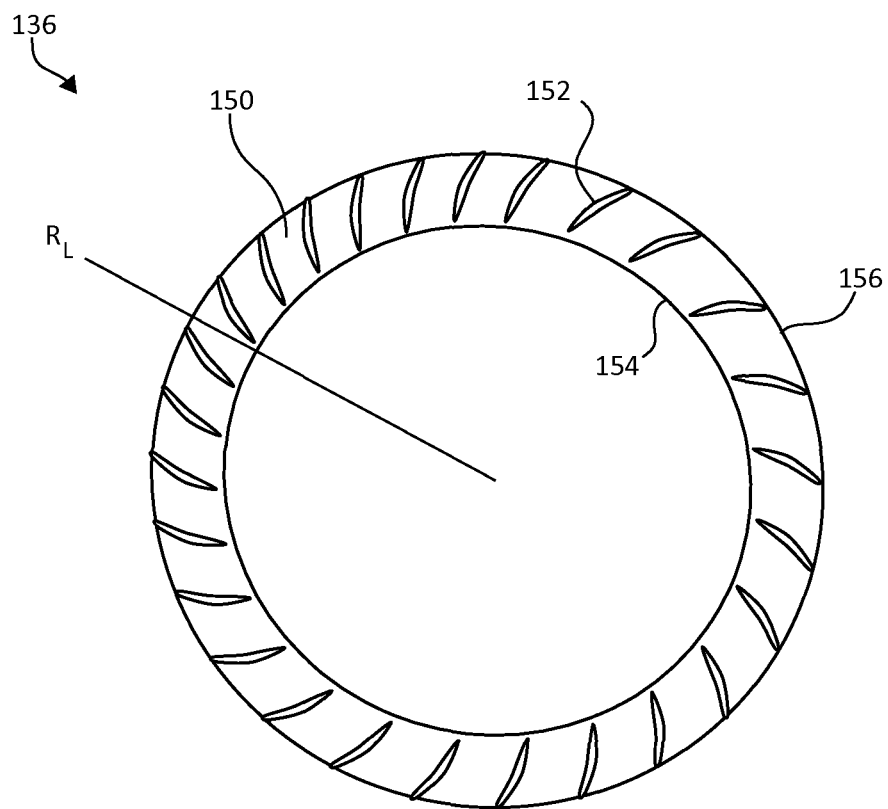
FIG. 4 illustrates a nose-mounted fan for driving air over a heat exchanger, in accordance with various embodiments.

In various embodiments, and with reference to FIGS. 3 and 4, nose cone 130 may comprise a secondary fan 136 coupled to nose cone 130. Secondary fan 136 may be balanced and fixedly coupled to nose cone 130 so that secondary fan 136 rotates with nose cone 130. Secondary fan 136 may urge cooling air 140 to flow over heat exchanger 128. Cooling air 140 may rejoin core flow-path C (of FIG. 1) aft of fan 42. Secondary fan 136 may thus rotate with nose cone 130 about engine central longitudinal axis A-A'. Secondary fan 136 may comprise an annular structure 150 having blades 152 configured to push air over heat exchanger 128. Blades 152 may have a base on annular structure 150 extending from the inner diameter 154 to the outer diameter 156 at an angle relative to radial line $R_L$. In that regard, rotating blades 152 may drive cooling air 140. Heat exchanger 128 may be disposed radially inward from a portion of nose cone 130.

In various embodiments, the cooling system 120 of the present disclosure improves the efficacy of heat exchanger 128 compared to heat exchangers placed elsewhere in gas turbine engine 20. The improved efficacy enables the omission additional heat exchangers for the fan drive system. By using otherwise empty volume in nose cone 130 for heat exchanger 128, additional free space may be created elsewhere in gas turbine engine 20. For example, a system that would otherwise make use of both a fuel-oil heat exchanger and an air-oil heat exchanger may only use an air-oil heat exchanger to prepare oil for gear system 100.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An oil cooling system, comprising:
   an oil inlet;
   a manifold fluidly coupled to the oil inlet;
   a support strut comprising internal tubing fluidly coupled to the manifold;
   a heat exchanger fluidly coupled to the internal tubing of the support strut; and
   a nose cone disposed forward of the heat exchanger and configured to rotate about an axis, wherein the heat exchanger is disposed radially inward from a portion of the nose cone.

2. The oil cooling system of claim 1, wherein the heat exchanger is an air-oil heat exchanger.

3. The oil cooling system of claim 1, further comprising a fan coupled to the nose cone, wherein the fan is configured to urge coolant over the heat exchanger.

4. The oil cooling system of claim 1, further comprising an epicyclic gear system, wherein the manifold is configured to transport oil across a fixed carrier of the epicyclic gear system.

5. The oil cooling system of claim 4, further comprising an oil outlet of the heat exchanger in fluid communication with a journal pin of the epicyclic gear system.

6. The oil cooling system of claim 1, wherein the heat exchanger is non-rotating.

7. A gas turbine engine, comprising:
   an epicyclic gear system;
   a fan mechanically coupled to the epicyclic gear system and configured to rotate about an axis;

a nose cone coupled to the fan and configured to rotate about the axis, the nose cone comprising a secondary fan configured to rotate with the nose cone; and a heat exchanger disposed forward of the fan and aft of the nose cone, wherein the heat exchanger is in fluid communication with the epicyclic gear system.

8. The gas turbine engine of claim 7, wherein the heat exchanger is disposed radially inward from a portion of the nose cone.

9. The gas turbine engine of claim 7, wherein the secondary fan is configured to urge coolant over the heat exchanger.

10. The gas turbine engine of claim 7, further comprising an oil outlet of the heat exchanger in fluid communication with a journal pin of the epicyclic gear system.

11. The gas turbine engine of claim 7, wherein the heat exchanger is non-rotating.

12. The gas turbine engine of claim 7, wherein the epicyclic gear system comprises a non-rotating carrier.

13. The gas turbine engine of claim 12, wherein a support strut couples the heat exchanger to the epicyclic gear system.

14. The gas turbine engine of claim 13, wherein the support strut comprises an internal tubing in fluid communication with the heat exchanger.

15. The gas turbine engine of claim 7, further comprising a bearing system forward of the epicyclic gear system and aft of the heat exchanger.

16. The gas turbine engine of claim 15, wherein the heat exchanger is configured to provide oil to the bearing system.

17. A cooling device, comprising:
a nose cone configured to rotate about an axis;
a heat exchanger disposed radially inward from a portion of the nose cone, wherein the heat exchanger is configured to remain static about the axis;
a support strut comprising internal tubing fluidly coupled to the heat exchanger;
a manifold fluidly coupled to the internal tubing of the support strut; and
an oil inlet fluidly coupled to the manifold.

18. The cooling device of claim 17, further comprising a fan coupled to the nose cone.

19. The cooling device of claim 18, wherein the fan is configured to urge fluid over the heat exchanger.

20. The cooling device of claim 17, wherein the heat exchanger comprises an air-oil heat exchanger.

* * * * *